United States Patent [19]

Majewicz

[11] Patent Number: 4,486,335

[45] Date of Patent: Dec. 4, 1984

[54] CARBOXYMETHYL HYDROXYETHYL CELLULOSE COMPOSITION

[75] Inventor: Thomas G. Majewicz, Chadds Ford, Pa.

[73] Assignee: Hercules Incorporated, Wilmington, Del.

[21] Appl. No.: 412,654

[22] Filed: Aug. 30, 1982

[51] Int. Cl.³ .................. C08L 1/26; E21B 43/26; C09K 7/02

[52] U.S. Cl. .................. 252/315.3; 252/8.5 C; 252/315.4; 252/8.55 R; 252/188.31; 536/91; 106/197 C

[58] Field of Search .............. 252/8.5 C, 315.3, 315.4; 536/91; 106/197 C

[56] References Cited

U.S. PATENT DOCUMENTS

| | | | |
|---|---|---|---|
| 3,092,619 | 6/1963 | Kohler et al. | 260/231 |
| 3,446,795 | 4/1965 | Boudreaux | 260/231 |
| 3,448,100 | 6/1969 | Callihan et al. | 260/231 |
| 3,898,165 | 8/1975 | Ely et al. | 252/8.55 R |
| 4,035,195 | 7/1977 | Podlas | 106/194 |
| 4,110,231 | 8/1978 | Swanson | 252/315.3 |
| 4,239,629 | 12/1980 | Sauber | 252/8.5 C |

FOREIGN PATENT DOCUMENTS

| | | | |
|---|---|---|---|
| 2036055 | 6/1980 | United Kingdom | 252/8.55 R |
| 2055106 | 2/1981 | United Kingdom | 106/194 |

*Primary Examiner*—Richard D. Lovering
*Assistant Examiner*—Anne Brookes
*Attorney, Agent, or Firm*—Joanne L. Horn

[57] ABSTRACT

A water-soluble carboxymethyl hydroxyethyl cellulose having a carboxymethyl degree of substitution of about 0.1 to about 0.25, preferably of about 0.15 to about 0.20, and having a hydroxyethyl molar substitution of greater than about 1.0 possesses unexpected qualities. When this composition is crosslinked with a suitable aluminum ion in an aqueous solution it forms a gel which exhibits no significant thinning at temperatures less than about 200° F.

8 Claims, No Drawings

CARBOXYMETHYL HYDROXYETHYL CELLULOSE COMPOSITION

BACKGROUND OF THE INVENTION

The present invention relates to water-soluble carboxymethyl hydroxyethyl cellulose. In particular, it relates to a carboxymethyl hydroxyethyl cellulose which when crosslinked with a suitable aluminum ion in an aqueous solution forms a gel which exhibits no significant thinning at temperatures less than about 200° F.

It is known in the art that gels having desirable viscoelastic properties can be made in aqueous solutions by using crosslinked carboxymethyl hydroxyethyl cellulose (hereinafter referred to as CMHEC). A significant drawback to these gels is that they are temperature sensitive. As the temperature of the crosslinked gel is increased, the gel's viscosity decreases in the manner well known for virtually all materials.

Gels containing crosslinked CMHEC are used extensively as oil well fracturing fluids. The incorporation of crosslinked CMHEC provides desirable viscosity and suspending power. Because these gels are temperature thinning, problems arise. In order to obtain a desired viscosity deep in the well where temperatures can be in the neighborhood of 200° F., a crosslinked gel of much higher viscosity must be prepared at the surface, where a typical temperature might be 80° F. It is difficult to obtain conveniently high flow rates into the well when pumping gels with this high viscosity.

U.S. Pat. No. 3,448,100 claims a process for the manufacture of carboxymethyl hydroxyalkyl mixed celluloses having a carboxymethyl degree of substitution (hereinafter referred to as DS) within the range from about 0.2 to about 1.0 and a hydroxyalkyl molar substitution (hereinafter referred to as MS) within the range of about 0.2 to about 5. The patent does not teach that within the infinite number of possible combinations of carboxymethyl (DS) and hydroxyalkyl (MS) those having a carboxymethyl (DS) of about 0.1 to about 0.25 and a hydroxyethyl (MS) greater than about 1.0 can be crosslinked with a suitable aluminum ion and used to prepare gels which exhibit substantially no thinning at temperatures less than about 200° F.

U.S. Pat. No. 4,239,629 claims a gel obtained in water by combining carboxymethyl hydroxyethyl cellulose with a compound selected from the group consisting of alkali metal and ammonium dichromate. The patent does not disclose that when the carboxymethyl hydroxyethyl celluloses of the present invention are crosslinked by a suitable aluminum ion to prepare gels in aqueous solutions, the gels exhibit substantially no thinning at temperatures less than about 200° F.

SUMMARY OF THE INVENTION

The improved water-soluble CMHEC composition of this invention has a carboxymethyl (DS) of about 0.1 to about 0.25, preferably of about 0.15 to about 0.20, and a hydroxyethyl molar substitution of greater than about 1.0. Gels prepared in aqueous solutions from the improved water-soluble CMHEC, crosslinked by a suitable aluminum ion, exhibit no significant thinning at temperatures less than about 200° F.

DETAILED DESCRIPTION OF THE PREFERRED EMBODIMENTS

Water-soluble carboxymethyl hydroxyethyl cellulose having a carboxymethyl (DS) of about 0.1 to about 0.25, preferably from about 0.15 to 0.20 can be crosslinked with a suitable aluminum ion to prepare gels in aqueous solutions which exhibit substantially no thinning at temperatures less than about 200° F. The term degree of substitution is known in the art. Degree of substitution is the average number of hydroxyl groups substituted in the cellulose per anhydroglucose unit. Consequently, carboxymethyl (DS) is the average number of carboxymethyl groups substituted per cellulosic anhydroglucose unit.

In accordance with the invention it has been found that when the carboxymethyl (DS) of the hydroxyethylated carboxymethyl cellulose of the invention is less than about 0.1, there is no significant gelation in the presence of the aluminum ion; and when the carboxymethyl (DS) is greater than about 0.25 gelation will occur but there is significant thinning at elevated temperatures. Preferred CMHEC compositions have a carboxymethyl (DS) of about 0.15 to about 0.2.

Extent of hydroxyethylation is described in terms of molar substitution. Molar substitution is the average number of moles of reactant combined with the cellulose per anhydroglucose unit. Consequently, hydroxyethyl (MS) is the average number of moles of hydroxyethyl incorporated per anhydroglucose unit. The hydroxyethylated carboxymethyl cellulose in accordance with this invention must have a hydroxyethyl (MS) which is sufficient to make the compound water-soluble. This typically requires a hydroxyethyl (MS) greater than about 1.0. For the purposes of this invention, there is actually no upper limit to the hydroxyethyl (MS) so long as the polymer remains water-soluble. However, it has been found that if the hydroxyethyl (MS) is too great, the gel strength of the crosslinked polymer is reduced. Consequently, for almost all applications the hydroxyethyl (MS) should be less than about 3.5. The best results have been found where the hydroxyethyl (MS) is in the range of about 2.0 to about 2.5.

The use of ionic agents to crosslink CMHEC is known to those skilled in the art. The ionic agents which are effective with the CMHEC composition of this invention are those containing an aluminum ion such as aluminum acetate and aluminum sulphate. Basic aluminum acetate has been found to be the crosslinking agent of choice. The amount of basic aluminum acetate used as the crosslinking agent is typically in the range of about 1% to about 5%, preferably in the range of about 2% to about 4%, based on the weight of the uncrosslinked polymer.

The amount of crosslinked CMHEC to be used to increase the viscosity of an aqueous solution will depend on the particular application and will be readily determinable to one skilled in the art. In general the amount of crosslinked CMHEC to be used will be in the range of about 0.1 to about 2% on the basis of the weight of crosslinked CMHEC.

The following examples are to further illustrate the invention and are not to be a limitation thereof. All percentages are by weight, based on the weight of the cellulose, unless otherwise clearly indicated.

EXAMPLES 1 THROUGH 15

The carboxymethyl hydroxyethyl cellulose of Example 6 was prepared in the following method:

A two-quart stirred autoclave glass bowl was charged with 64.8 g. (0.4 mole) cotton linters (dry weight) and 1000 ml. t-butyl alcohol (99.5+%). The bowl was then sealed to the reactor and purged of oxygen, evacuating to 26 inches gauge vacuum followed by pressurization to 20 psig with nitrogen. This vacuum-pressurized cycle was repeated 5 times, after which a caustic solution (61.7 g. 50% NaOH/73 ml. H₂O) was added, via a syringe, to the stirred cellulose slurry under vacuum. The reactor was given another five degassing cycles, as above. The alkali cellulose was allowed to stir for 60 minutes at 15°–20° C. under 10 psig nitrogen. A monochloroacetic acid solution (10.4 g. MCA/25 ml. tert-butyl alcohol) was then introduced to the slurry, under vacuum, via a syringe. After pressurization to 10 psig N₂, the reaction was then heated to 70° C. (approximately 30-minute heatup period) and maintained for 30 minutes. Upon cooling to 40° C. and evacuating to approximate 20 inches vacuum, 79.0 g. ethylene oxide condensed in a Fischer-Porter tube, was added. After pressurization to 10 psig N₂, the reaction was held at 45° C. for 60 minutes, then at 80° C. for 120 minutes. Upon cooling to less than 30° C., the reaction mixture was neutralized with 31 ml. HNO₃ (70%) and 5 ml. glacial acetic acid. After filtration, the wet cake was batch washed in acetone, then dehydrated with 99.5% acetone and dried.

Examples 1–5, 7–11 and 13–15 were carried out in an analogous manner except that the amount of NaOH, monochloroacetic acid and ethylene oxide added were varied to give the carboxymethyl (DS) and hydroxyethyl (MS) outlined in Table 1.

In Example 12, two steps of the procedure was reversed. Ethylene oxide was first reacted with akali cellulose and the reaction product was then treated with monochloroacetic acid.

Gel stabilities were obtained for each example in the following manner:

0.2 g. potassium acetate, 0.8 g. polymer and 3.2 g. potassium chloride were dry blended in a one oz. wide mouth bottle. 0.2 g. of basic aluminum acetate was added to 100 ml. of distilled water in a 150 ml. beaker. The contents of the beaker were air-stirred for 10 minutes. 150 ml. of tap water and the dry blended mixture were added to a thermal cup with agitation at 600 rpm. After 10 minutes, 0.2 ml. of glacial acetic acid (potassium acetate and acetic acid buffered to pH 4.5) was added to the thermal cup. Next was added 10 ml. of the basic aluminum acetate solution. The thermal cup was turned on and the sample heated to 180° F. The torque generated at 600 rpm constant agitator speed was measured with a sensor attached to the thermal cup at 20° intervals from 80° to 180° F. The results are shown in Table 1.

TABLE 1

| Example | Carboxymethyl (DS) | Hydroxyethyl (MS) | Torque for Crosslinked Gels at Temperature (°F.) | | | | | |
|---|---|---|---|---|---|---|---|---|
| | | | 80° | 100° | 120° | 140° | 160° | 180° |
| 1 | 0.07 | 2.94 | poor gel | | | | | |
| 2 | 0.08 | 1.91 | no gel | | | | | |
| 3 | 0.09 | 1.19 | no gel | | | | | |
| 4 | 0.16 | 2.27 | 9.1 | 9.1 | 10.5 | 13.9 | 14.1 | 12.7 |
| 5 | 0.18 | 1.62 | 9.3 | 9.9 | 12.3 | 13.5 | 12.0 | 10.5 |
| 6 | 0.18 | 2.54 | 10.9 | 10.1 | 10.7 | 11.7 | 12.2 | 12.0 |
| 7 | 0.18 | 2.70 | 6.3 | 5.7 | 5.7 | 6.2 | 6.2 | 5.4 |
| 8 | 0.19 | 1.31 | 8.6 | 8.5 | 9.8 | 11.9 | 11.3 | 9.8 |
| 9 | 0.19 | 2.28 | 9.9 | 10.1 | 10.7 | 11.0 | 10.1 | 9.1 |
| 10 | 0.19 | 2.31 | 8.7 | 8.9 | 9.9 | 11.8 | 12.2 | 11.3 |
| 11 | 0.19 | 3.47 | 5.0 | 4.1 | 5.6 | 7.0 | 7.6 | 7.4 |
| 12 | 0.21 | 2.00 | 8.2 | 7.8 | 8.8 | 10.3 | 11.4 | 9.6 |
| 13 | 0.26 | 1.70 | 17.7 | 15.6 | 13.4 | 11.3 | 9.4 | 8.1 |
| 14 | 0.29 | 2.74 | 10.6 | 9.2 | 6.8 | 4.9 | 3.0 | 1.6 |
| 15 | 0.30 | 1.03 | 17.6 | 14.9 | 12.2 | 9.6 | 7.9 | 6.5 |

What I claim and desire to protect by Letters Patent is:

1. A crosslinkable carboxymethyl hydroxyethyl cellulose composition containing essentially of (a) a carboxymethyl hydroxyethyl cellulose having a carboxymethyl degree of substitution from about 0.1 to 0.19 and a hydroxyethyl molar substitution of greater than about 1.0, and (b) an ionic agent containing an aluminum ion in the form of an aluminum salt.

2. The composition of claim 1 wherein the aluminum salt is selected from the group consisting of aluminum acetate and aluminum sulphate.

3. The composition of claim 1 wherein the carboxymethyl hydroxyethyl cellulose has a carboxymethyl degree of substitution of from about 0.15 to 0.19.

4. The composition of claim 1 wherein the hydroxyethyl molar substitution is from about 2.0 to about 2.5.

5. The composition of claim 1 wherein the hydroxyethyl molar substitution is less than 3.5.

6. The composition of claim 1 wherein the aluminum salt is aluminum acetate.

7. The composition of claim 6 wherein the aluminum acetate is present in an amount from about 1% to about 5%, by weight of the uncrosslinked carboxymethyl hydroxyethyl cellulose.

8. The composition of claim 6 wherein the aluminum acetate is present in an amount from about 2% to about 4%, by weight of the uncrosslinked carboxymethyl hydroxyethyl cellulose.

* * * * *